Dec. 11, 1951     E. W. GOSSWILLER     2,578,239
ENCLOSED ROTATING SIGNAL LIGHT

Filed Sept. 2, 1948     4 Sheets-Sheet 1

Inventor:
Earl W. Gosswiller
By Lee J. Gary
Attorney

Dec. 11, 1951     E. W. GOSSWILLER     2,578,239
ENCLOSED ROTATING SIGNAL LIGHT
Filed Sept. 2, 1948     4 Sheets-Sheet 2

Inventor:
Earl W. Gosswiller
By: Lee J. Gary
Attorney

Dec. 11, 1951     E. W. GOSSWILLER     2,578,239
ENCLOSED ROTATING SIGNAL LIGHT
Filed Sept. 2, 1948     4 Sheets-Sheet 4

Inventor:
Earl W. Gosswiller
By: Lee J. Gary
Attorney

Patented Dec. 11, 1951

2,578,239

UNITED STATES PATENT OFFICE 2,578,239

ENCLOSED ROTATING SIGNAL LIGHT

Earl W. Gosswiller, Chicago, Ill., assignor to Federal Enterprises, Inc., Chicago, Ill., a corporation of New York Application September 2, 1948, Serial No. 47,405

8 Claims. (Cl. 177—329)

This invention relates to improvements in a rotating signal light and refers particularly to a self-contained unit which may be mounted upon a vehicle or other support it being merely necessary to connect said unit to a suitable source of electric current.

One of the objects of the present invention is a rotating signal light construction which comprises one or more continuously rotating signal lamps and means for supporting and rotating said lamp or lamps, all contained as a unit in a weatherproof housing.

Other objects and advantages of the present invention will be apparent from the accompanying drawings and following detailed description.

In the drawings, Fig. 1 is an elevational view of the improved signal light.

Figure 1:
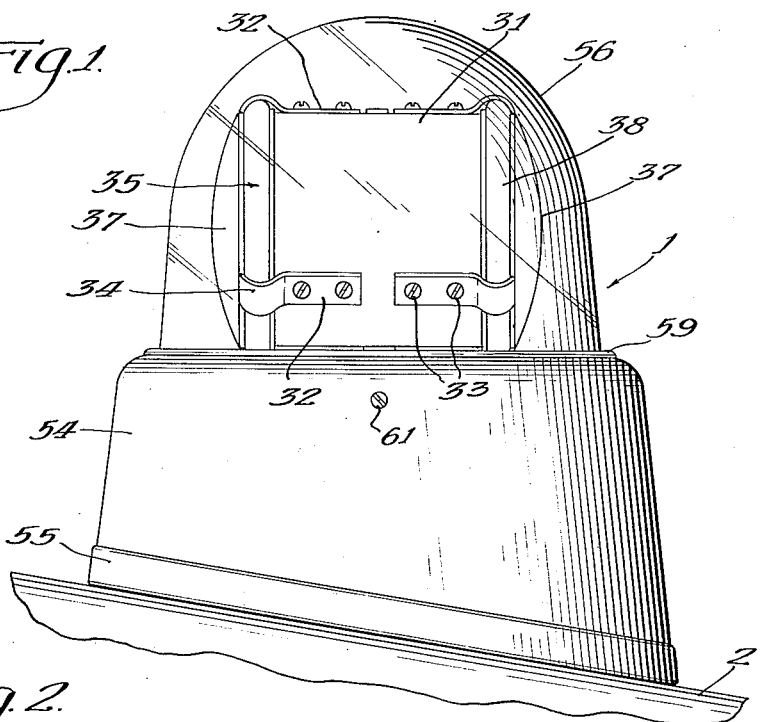
Figure 2:
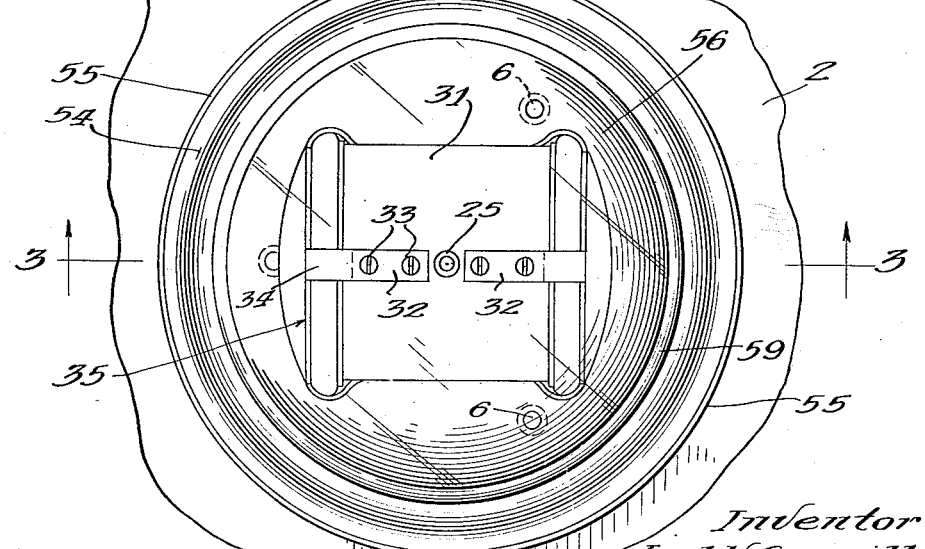
Fig. 2 is a top plan view of the light illustrated in Fig. 1.

Referring in detail to the drawings, 1 indicates a signal light embodying the concepts of the present invention. The signal light 1, for purposes of illustration, is shown and described as being mounted upon the top or roof 2 of an automotive vehicle, the surface of the roof being inclined. Of course, the invention is not to be limited to the specific support upon which the light is adapted to be carried since the operation of the light is not dependent upon its means of support.

The light 1 comprises a platform 3 having a downwardly extending marginal annular flange 4 formed integral therewith. A reinforcing plate 5 is positioned upon the upper surface of the platform 3 and is preferably circular in shape. The platform 3 is adapted to be supported in a substantially horizontal position and is carried by a plurality of vertically disposed toggle bolts 6.

In mounting the platform 3 upon the support, openings 7 are provided in the supporting surface 2 and the pivoted toggles 8 carried at the ends of the bolts 6 are inserted through said openings. The bolts 6 are then so manipulated as to cause the toggles 8 to assume a transverse relationship with respect to the axes of the bolts. The bolts 6 are provided with threads 9 and nuts 10 are engageable with said threads. A pair of companion washers 11 and 12 embrace the shank of each bolt 6, said washers being constructed of rubber or other relatively resilient material and each of the washers having one or both surfaces inclined to the axis of the aperture. A metallic washer 13 also embraces the shank of each bolt 6 and is adapted to sustain the force of the nut 10 when the same is screwed downwardly.

By virtue of the character and shape of the washers 11 and 12 the axes of the bolts 6 may be disposed vertically, independent to a large degree upon the angle of inclination or contour of the supporting surface 2. By relatively rotating washer 11 with respect to washer 12, a range of angles may be obtained whereby the lower surface of washer 12 will be in plane-parallel relationship with the supporting surface, and the upper surface of washer 11 will be in a plane at right angles to the axis of the bolt. In this fashion the bolts 6 may be tightly secured to the supporting surface 2 with the axes of the bolts disposed vertically. In addition, the washers 11 and 12 form a substantially leakproof and weatherproof seal with the mounting surface 2.

At the upper end of each bolt 6 a pair of nuts 14 and 15 are adapted to engage the threads 9 upon each side of the platform 3, the platform being provided with appropriate apertures through which the bolts may be passed. The arrangement is such that the vertically disposed bolts 6 will carry the platform 3 in a substantially horizontal plane.

A housing 16 is mounted upon the bottom face of platform 3 by means of screws or the like 17 which pass through marginal flanges 18 formed upon the walls of the housing 16. An electric motor 19 is mounted upon one of the walls of the housing 16 by means of bolts 20 or the like, the shaft 21 of the motor projecting into the interior of the housing. A worm 22 is mounted upon the end of shaft 21 and is adapted to engage with a worm wheel 23 which is secured by means of set screw 24 to a vertically disposed hollow shaft 25. The shaft 25 is carried at its lower end by means of ball bearings 26 and said shaft passes upwardly through an aperture 27 provided in the platform 3 and plate 5. A combination thrust and radial ball bearing assembly 28 supports the shaft upon the platform 3. A spring member 29 embraces the shaft 25 and a collar 30 is mounted upon the shaft and bears against the spring member 29 whereby electrical contact is made to the rotating assembly without the necessity of the current flowing through the bearings 26 and 28.

Above the platform 3 and plate 5, a cylindrical housing 31 is mounted upon the shaft 25, the axis of the cylindrical housing 31 being disposed transversely to the shaft. A plurality of retaining lugs 32 are mounted upon the outer wall of the housing 31 by means of screws 33 or the like, the lugs 32 having curved ends 34. The housing 31 is open at each of its ends and a lamp 35 is adapted to be positioned at each of the open ends of the housing.

The lamps 35 are preferably of the conventional sealed-beam type having a reflector body 36, a lens 37 and a rim 38, or said lamps might comprise the usual reflector and miniature auto bulb type with plain or refracting type lens. The ends 34 of the lugs 32 are adapted to engage the rims 38 of the lamps 35 and retain said lamps in position upon the ends of the housing 31, the optical axes of said lamps being disposed substantially horizontal and the centers of the lamps being coaxial.

A strap 39 is carried by housing 16 and functions as a guard for contact spring 42, one end of the strap being secured to the housing by means of screws or the like 40, insulating strips 41 being interposed between the strap 39 and the wall of the housing 16. Through said insulating strips an electrical conductor 42 is carried which comprises a spring member, the free end of which makes electrical contact with a button 43 carried at the bottom of the hollow shaft 25.

The member 42 is connected to a suitable source of electric current by means of lead 44 and button 43 is connected to a lead 45 which passes through the hollow interior of shaft 25. The lamps 35 are each provided with terminals 46 and 47. The lead 45 passing through the center of shaft 25 is connected to a binding post 48 which is carried upon a spring contact member 49 which makes contact with one of the terminals 46. A similar arrangement is contemplated for the remaining terminals 46 on the opposite lamp.

A lead 50 is connected to a binding post 51 upon housing 31 at one end and at the opposite end is connected to a binding post 52 carried upon spring contact member 53, the latter contact member being connected to the terminal 47. A similar arrangement is contemplated with respect to the opposite terminal 47.

A base housing 54 is adapted to enclose the space between the platform 3 and the supporting surface 2, said housing comprising a metallic member preferably of sheet material. A rubber gasket 55 is mounted upon the lower edge of the housing 54 and makes contact with the surface 2 whereby a weather proof joint is provided between the lower edge of the housing 54 and the supporting surface 2. A housing 56 preferably in the form of a dome or bubble, is mounted upon the upper portion of platform 3, said housing being constructed of glass, "Plexiglas," or other transparent or translucent material. If desired, the housing 56 may be water-white or may be colored, or the housing may be multicolored, for instance, one-half may be green and the other half red, or any other combination of two or more colors may be used. If a water-white housing is used, various combinations of colored lamps or lamps with colored lenses may be used, such as, red and green, red and blue, etc. In this way various types of emergency vehicles such as police patrols, ambulances, tow trucks, etc., may be coded. The light will then give alternate flashes of color and will identify the vehicle from afar. If desired, portions of the housing 56 may be rendered opaque. For instance the inside of the dome may be painted to block the light from striking the driver of the vehicle if the light were mounted on the fender or hood of the vehicle.

Figure 3:
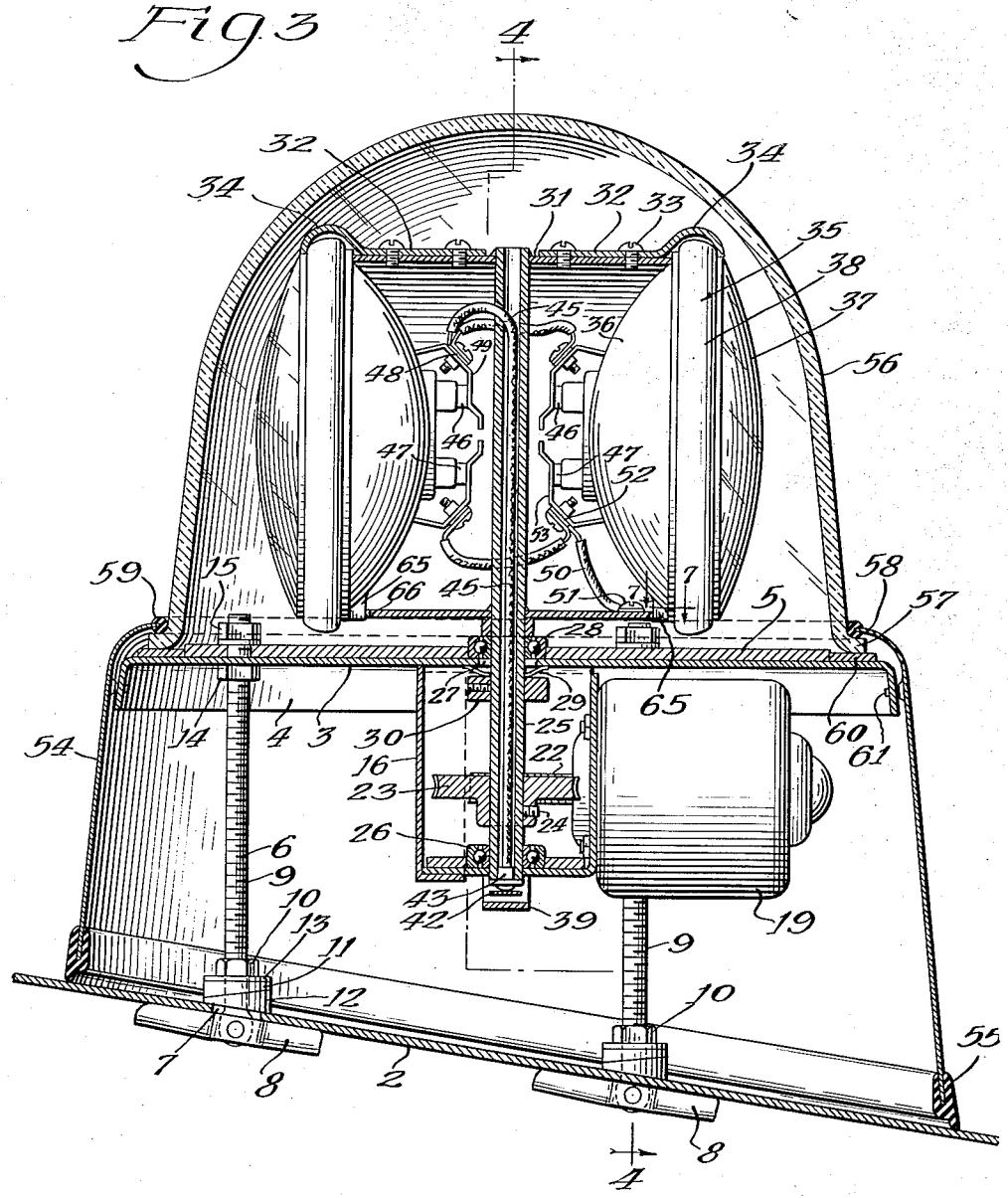
Fig. 3 is an enlarged sectional view taken on line 3—3 of Fig. 2.
Figure 4:
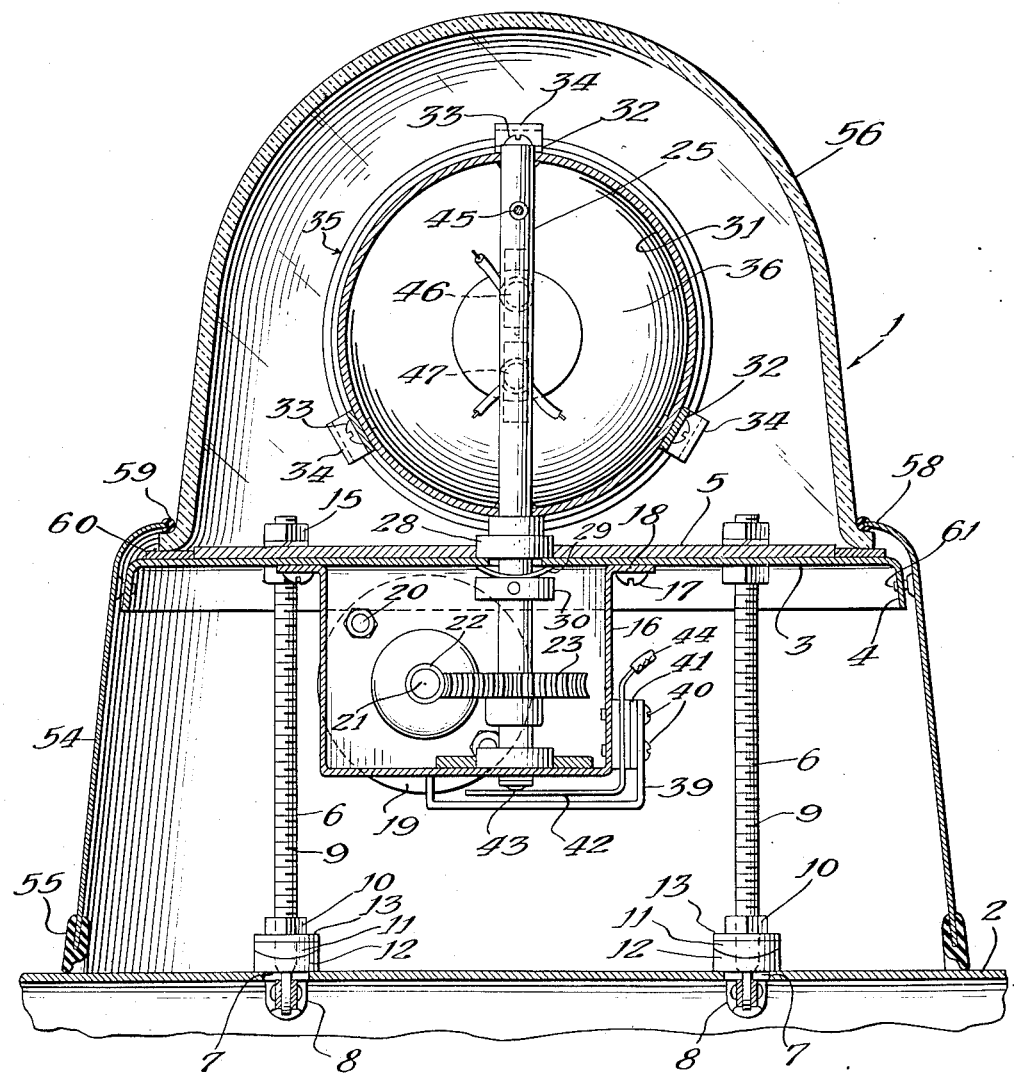
Fig. 4 is a sectional view taken on line 4—4 of Fig. 3.
Figure 5:
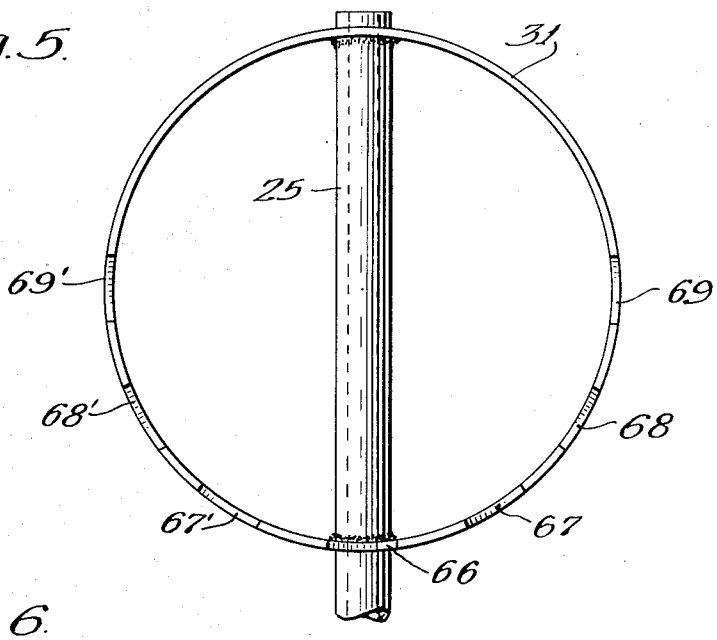
Fig. 5 is an enlarged detailed view of the cylindrical lamp support.
Figure 6:
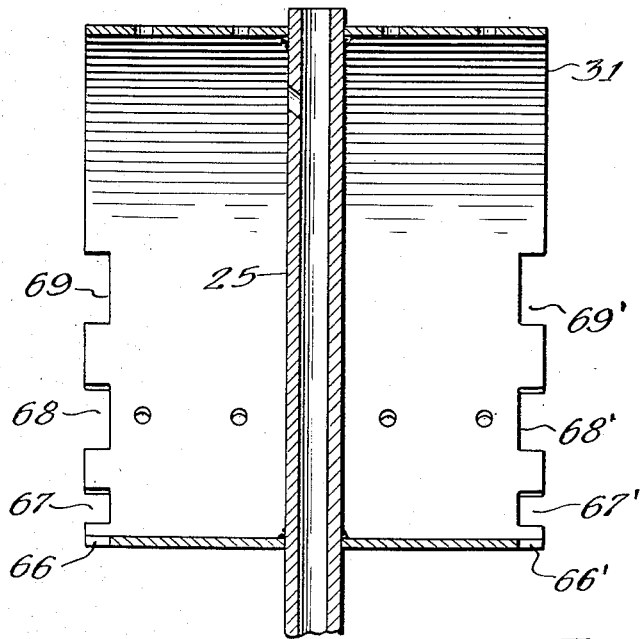
Fig. 6 is a longitudinal sectional view of the lamp support shown in Fig. 5.
Figure 7:
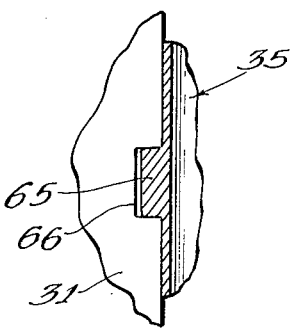
Fig. 7 is a fragmentary detailed view illustrating the registering relationship of a lamp lug with a lamp support notch.

The housing 56 is provided with an outwardly extending annular flange 57 and the upper edge of the housing 54 is turned inwardly as shown best at 58 in Figs. 3 and 4, the innermost edge carrying a resilient rubber gasket 59 which makes engagement with the annular flange 57 of the housing 56. An annular gasket of relatively flexible material 60 is positioned upon the platform 3 adjacent its marginal edge and provides a support for the flange 57 of the housing 56.

Apertures (not shown) are provided in the upper portion of the housing wall 54, and screws 61 are carried in said apertures, said screws being engageable with the downwardly extending marginal flange 4 of the platform 3 whereby the housing 54 and dome 56 will be assembled in a weather-tight and secure relationship.

In operation, suitable electric switching means (not shown) may be associated with the device whereby current may be passed to the lamps 35. The electric motor 19 may be connected in the same circuit, if desired, whereby the motor may be operated simultaneously with the illumination of the lamps 35 or the connections to the motor (not shown) may be operated separately from the illuminating circuit of the lamps in which case the motor may be operated independently of the illumination of the lamps.

When the motor is operated and the lamps are illuminated the motor drives the vertical shaft 25 by means of the gear arrangement hereinbefore described thereby rotating housing 31 and lamps 35 carried by said housing. In the preferred form the rotation of the lamps casts oppositely extending light beams which when the lamps are rotated, revolve in a substantially horizontal plane. Of course, if desired, the axes of the lamps 35 may be canted so that the beams cast by the lamps will revolve in a conical surface rather than a horizontal plane. To accomplish this it is believed within the province of any one skilled in the art to so mount the lamps 35 that the axes are not along the same line.

There are a number of features which are of importance in conjunction with the present invention. One of the important features is the provision of a rotating signal light which is self-contained and which may be mounted upon substantially any desirable support. Another important feature of the invention resides in a signal light unit which can be readily assembled and mounted upon a suitable support and which is weather proof. This latter is of extreme importance in view of the fact that such signal lights are frequently used under severe weather conditions.

If the light is to be used in hilly country more vertical spread of the light beams may be required than in the case where the light is used in flat country. Both conditions may be satisfied with one type of lamp having a beam the section of which is relatively longer than it is wide. Control of vertical coverage may be had by rotating the lamp about its axis so that the long part of the beam is vertical or horizontal or anywhere between these two extremes.

To accomplish this adjustment each lamp 35 carries a lug 65 which is adapted to register in any one of the notches 66 to 69 inclusive or 66' to 69' inclusive provided in the edges of the cylindrical housing or lamp carrier 31. It can readily be seen that if the beams cast by the lamps are not symmetrical both vertically and horizontally about the longitudinal axes of the beams, the traces of the beams may be changed to cover numerous patterns merely by positioning one or both lamps with their lugs 65 disposed in predetermined notches.

Another manner in which a similar end may be accomplished is to employ a refracting lens of the prismatic type for the lenses 37, whereby the axis of the projected light beam may be disposed at a predetermined angle to the central axis of the lamp.

The use of toggle bolts for mounting the signal light upon the roofs of passenger automobiles has several advantages. It is not necessary to remove or disturb the upholstery below the mounting surface during installation and after installation the toggle bolts are not visible. Also the use of three bolts permits leveling of the lamp platform substantially regardless of the contour of the mounting surface even though it may be convex, concave, flat and inclined materially to the horizontal.

I claim as my invention:

1. A signal light comprising in combination a platform, means for mounting said platform upon a support, a housing carried by said platform, an electric motor mounted upon said housing and having its shaft extending into said housing, a shaft journalled in said housing and in said platform, means connecting said motor shaft and said latter shaft, supporting means carried upon said latter shaft exteriorly of said housing, a pair of electric lamps adjustably carried by said supporting means for rotation by said latter shaft, and a translucent housing mounted upon said platform enclosing said lamps and the portion of said shaft exterior of said first-mentioned housing.

2. A signal light comprising in combination a platform, means for mounting said platform upon a support, a shaft journalled in said platform and extending at substantially right-angles thereto, means for rotating said shaft, a lamp support carried by said shaft, a lamp adjustably carried by said support and rotatable with said shaft for projecting a beam of light transversely to said shaft, means for disposing the outer envelope of said beam at a predetermined angle to said shaft, and a translucent housing mounted upon said platform and enclosing a portion of said shaft and lamp support and the lamp carried thereby.

3. A signal light comprising in combination a platform, means for mounting said platform upon a support, a housing carried by said platform, an electric motor mounted upon said housing and having its shaft extending into said housing, a shaft journalled in said housing and in said platform, means connecting said motor shaft and said latter shaft, supporting means carried upon said latter shaft exteriorly of said housing, a pair of electric lamps adjustably carried by said supporting means for rotation by said latter shaft for projecting beams of light transversely to said shaft, a translucent housing mounted upon said platform enclosing said lamps and the portion of said shaft exterior of said first-mentioned housing, and means for coloring said light beams.

4. A signal light comprising in combination a platform, means for mounting said platform upon a support, a shaft journaled in said platform and extending at substantially right angles thereto, means for rotating said shaft, a substantially cylindrical lamp support carried intermediate its length by said shaft and rotatable with said shaft, said cylindrical support being open at both ends, a lamp positioned at each open end of said lamp support for projecting beams of light transversely to said shaft and outwardly with respect to the ends of said cylindrical lamp support, means carried adjacent the ends of said support for removably securing said lamps to the support, and a translucent housing mounted upon said platform and enclosing a portion of said shaft and lamp support and lamps carried thereby.

5. A signal light comprising in combination a platform, means for mounting said platform upon a support, a shaft journaled in said platform and extending at substantially right angles thereto, means for rotating said shaft, a substantially cylindrical lamp support carried intermediate its length by said shaft and rotatable with said shaft, said cylindrical support being open at both ends, a lamp positioned at each open end of said lamp support and spaced from said shaft for projecting beams of light transversely to said shaft and outwardly with respect to the ends of said cylindrical lamp support, means carried adjacent the ends of said support for removably securing said lamps to the support, and a translucent housing mounted upon said platform and enclosing a portion of said shaft and lamp support and lamps carried thereby.

6. A signal light comprising in combination, a platform, means for mounting said platform upon a support, a shaft journaled in said platform and extending at substantially right angles thereto, means for rotating said shaft, a lamp support carried by said shaft and rotatable therewith, said support being provided with a notch, a lamp positioned upon said lamp support, a lug carried by said lamp for engagement with said notch, means for removably securing said lamp upon the lamp support with said lug in engaged relationship with said notch, and a translucent housing mounted upon said platform and enclosing a portion of said shaft and lamp support and lamp carried thereby.

7. A signal light comprising in combination, a platform, means for mounting said platform upon a support, a shaft journaled in said platform and extending at substantially right angles thereto, means for rotating said shaft, a lamp support of substantially circular cross-section carried by said shaft and rotatable therewith, said support being provided with a plurality of circumferentially spaced notches, a lamp having an optical axis positioned upon said lamp support with the optical axis transverse to said shaft, said lamp projecting a beam of light along said optical axis which is non-symmetrical about said optical axis, a lug carried by said lamp for registration with one of said notches, means for removably securing said lamp upon said lamp support with said lug in a predetermined notch to dispose said beam in a predetermined position with respect to said shaft, and a translucent housing mounted upon said platform and enclosing a portion of said shaft and lamp support and lamp carried thereby.

8. A signal light comprising in combination, a platform, means for mounting said platform upon a support, an electric motor carried beneath said platform, a bearing bracket secured to said motor, a shaft journaled in said bearing bracket and extending through said platform at substantially right angles thereto and being driven by said electric motor, a lamp support carried by said shaft, and rotatable therewith, said support being provided with a notch, a lamp positioned upon said lamp support, a lug carried by said lamp for engagement with said notch, means for removably securing said lamp upon the lamp support with said lug in engaged relationship with said notch, and a translucent housing mounted upon said platform and enclosing a portion of said shaft and lamp support and lamp carried thereby.

EARL W. GOSSWILLER.

REFERENCES CITED

The following references are of record in the file of this patent:

UNITED STATES PATENTS

| Number | Name | Date |
|---|---|---|
| 590,949 | Wilken | Sept. 28, 1897 |
| 1,238,220 | Thurber | Aug. 28, 1917 |
| 1,417,457 | Cook | May 23, 1922 |
| 1,423,726 | Mohr | July 25, 1922 |
| 1,486,731 | Cook | Mar. 11, 1924 |
| 2,224,742 | Muldoon | Dec. 10, 1940 |
| 2,508,071 | Martin et al. | May 16, 1950 |